T. J. EDDY.
Car Wheel.
No. 9,897.
Patented Aug. 2, 1853.
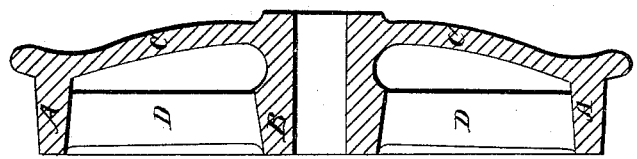
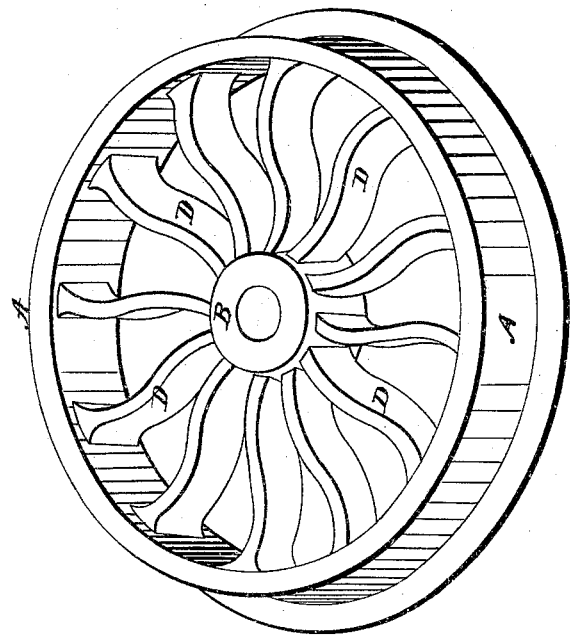

UNITED STATES PATENT OFFICE.

THOS. J. EDDY, OF WATERFORD, NEW YORK.

RAILROAD-CAR WHEEL.

Specification of Letters Patent No. 9,897, dated August 2, 1853.

*To all whom it may concern:*

Be it known that I, THOMAS J. EDDY, of Waterford, in the county of Saratoga and State of New York, have invented certain new and useful Improvements in Cast-Iron Wheels for Cars, of which the following is a full, clear, and exact description, reference being made to the accompanying drawing, which makes part of the specification, and in which—

Figure 1 represents a view in perspective of a car wheel embracing my improvements; and Fig. 2 a section of the same.

My invention consists in connecting the solid hub and chilled rim of a cast iron wheel by means of a series of spokes and a disk all cast in one piece, and severally formed and arranged in such manner that they will not be strained by the contraction of the metal as it cools and solidifies at the time the wheel is cast.

In the accompanying drawing the rim (A) and hub (B) of the wheel as represented, are of the usual form. The inner end of the hub is connected with the flanged edge of the rim by means of a disk (C) which in this instance is made dishing or curved with its convex side outward. The outer end of the hub and outer edge of the rim are connected by spokes (D) each in this example having a double curve. These curvatures of the spoke and disks, admit of the contraction of the rim and hub in cooling without producing any injurious strain upon the metal. By this disposition of the several parts of the wheel great facilities are afforded for making the mold, and for breaking and stirring the core so that it may yield, to prevent the metal from being strained as it shrinks in cooling. And when the wheel is finished, it embraces the peculiar advantages of both the cast-spokes and cast-disk combined.

What I claim as my invention and desire to secure by Letters Patent is—

A cast iron car wheel made in one piece, in which one end of the hub is united to the rim by means of a disk, and the other by means of a series of spokes, substantially as herein set forth.

In testimony whereof I have hereunto subscribed my name.

THOMAS J. EDDY.

Witnesses:
  I. CRAMER, 2d.,
  I. H. THORN.